United States Patent [19]

Dahlquist

[11] 4,083,832

[45] Apr. 11, 1978

[54] BLOOD COMPATIBLE VESSELS AND COMPONENTS THEREOF

[75] Inventor: Carl A. Dahlquist, Roseville, Minn.

[73] Assignee: Minnesota Mining and Manufacturing Company, St. Paul, Minn.

[21] Appl. No.: 559,249

[22] Filed: Mar. 17, 1975

[51] Int. Cl.$^2$ .................... C08F 212/08; C08F 212/10

[52] U.S. Cl. ............................... 260/79.3 R; 260/874; 260/881; 260/885; 260/886

[58] Field of Search .................. 260/79.3 R, 874, 881, 260/885, 886

[56] References Cited

U.S. PATENT DOCUMENTS

| | | | |
|---|---|---|---|
| 2,400,720 | 5/1946 | Staudinger et al. | 260/79.3 R |
| 2,945,842 | 7/1960 | Eichhorn et al. | 260/79.3 R |
| 3,642,953 | 2/1972 | O'Neill et al. | 260/79.3 R |
| 3,947,539 | 3/1976 | Lane | 260/79.3 R |

*Primary Examiner*—V. P. Hoke

*Attorney, Agent, or Firm*—Cruzan Alexander; Donald M. Sell; Temple Clayton

[57] ABSTRACT

Vessels for the storage, handling, conduction or treatment of blood or blood components are fabricated from styrene-aliphatic vinyl copolymers and the blood contacting surfaces of the vessel are treated with fuming sulfuric acid to provide a durable layer which is slippery when wet with water and has a zeta potential in the range −75 to −5 millivolts. Surfaces with these characteristics show only slight tendency to clot blood in contact therewith.

5 Claims, No Drawings

BLOOD COMPATIBLE VESSELS AND COMPONENTS THEREOF

This invention relates to vessels and components therefor having low tendency to causing the clotting of blood in contact therewith and useful in connection with storage or handling of blood. The invention further relates to articles such as containers, tubes and membranes having low thrombogenicity and adapted for use in contact with blood.

It is well known that blood coagulates at different rates in contact with different surfaces. For example, normal human blood coagulates quickly in contact with glass, but more slowly in contact with glass that has been "siliconized," i.e., glass whose surface has been treated with a reactive organic silicone compound to render the surface hydrophobic. It has been reported that blood coagulates more rapidly on surfaces of high critical surface tension than on surfaces of low critical surface tension. The "critical surface tension" of a surface is determined by plotting the contact angles of drops of various liquids on the surface against the surface tensions of the liquids to find the highest surface tension at which the contact angle is zero degrees [Zisman, W. A. Advan. Chem. Ser. 43,20 (1964)].

In contrast to surfaces of low surface energy, it has been found that swollen hydrogels may also exhibit nonthrombogenic behavior. The hydrogels are hydrophilic polymers which are crosslinked by covalent chemical bonds or by ionic charges of opposite sign. Such polymers become highly swollen in water but do not dissolve, forming soft, highly hydrated gels. It is believed that such gels more closely approximate in physical character the natural surfaces of blood vessels, hence the lower tendency to cause clotting. The efficiency of hydrogels is in direct proportion to their water content.

Hydrogels, however, are weak and fragile. This weakness is also proportional to water content. They are known to crack easily, becoming crazed with crevices in which bacteria can lodge and multiply in an environment favorable for growth, thereby causing infection. Thus, improvements in non-thrombogenicity brought about by increasing water content quickly result in the hydrogels becoming so weak as to be mechanically useless. The hydrogels are thus not in themselves strong enough to form useful shaped objects for containing or transporting blood. Attempts to circumvent this problem involve their use as coatings, and elaborate means of bonding them must be employed. Even so, they may loosen and slough off. A grafted-on layer of hydrogel is still subject to the rule that its non-thrombogenicity is proportional to water content so that an excessively swollen isotropic hydrogel coating becomes cohesively weak and may split within itself and slough off. Were this to happen in an artificial segment of an artery the consequence to the patient could be disastrous.

It is one object of this invention to provide vessels for handling blood which are self-supporting and have reduced thrombogenicity over the usual plastics and glass. Other objects will become evident hereinelsewhere.

It has now been found that a particular class of surface-sulfonated styrene-aliphatic vinyl compounds provides vessels and containers for handling blood in accordance with the objects of the invention. These materials are related to but not identical with the slippery polymers disclosed and claimed in Campbell et al., U.S. Ser. No. 336,244, filed Feb. 27, 1973. The present materials differ from the broad class of sulfonated polymers therein disclosed and claimed in that lower proportions of the aromatic constituent, styrene, are used together with lower proportions of an aliphatic vinyl compound comonomer. Furthermore, as will become evident hereinafter, particular properties are needed for the sulfonated polymer to have enhanced non-thrombogenicity. It is found that this class of sulfonated polymers provides a surface region which is hydrophilic and imbibes and holds water, which is securely bonded to and an integral part of the hydrophobic polymer substrate, but which differs chemically and morphologically from the typical, uniformly crosslinked hydrogel described above. The novel surface region is obtained when certain styrene aliphatic vinyl copolymers are sulfonated so that hydrophilic groups are attached to the polymer chains in a graded manner, the outermost polymer chains receiving the largest number of hydrophilic groups per given unit of chain length, the number of hydrophilic groups per unit of chain length, the number of hydrophilic groups per unit of chain length diminishing in the direction of the interior until the composition of the unmodified interior is reached. Articles of styrene-aliphatic vinyl copolymers are thus provided with a hydrophilic skin or zone on whatever surfaces are treated. Because of the gradation in hydrophilicity in this zone, the outermost portions of this hydrophilic zone becomes highly hydrated and swollen in contact with aqueous media, but swelling diminishes progressively in the direction of the interior of the solid and the interior portion of the treated zone will not become hydrated and consequently remains firmly fixed in the hydrophobic solid. Portions of the skin can be removed by scraping with a spatula so that cataphoretic, i.e., electrophoretic, properties can be determined.

A distinctive feature of the hydrophilic skin or zone is that when totally immersed in aqueous media its outermost, most highly swollen portion breaks up into microscopic and submicroscopic strands or cilia which are fixed at their interior ends and project into the aqueous phase. This is termed a ciliate surface. These strands are highly flexible. The outermost region of the hydrophilic zone approaches a condition of high dilution in the aqueous medium. These materials having hydrophilic zones or skins have been found to be outstanding in their ability to function in contact with blood, demonstrating a high degree of non-thrombogenicity and being non-adherent and non-damaging to blood cellular elements.

As stated above, the surface sulfonated styrene-aliphatic vinyl compounds which provide the hydrophilic ciliated surfaces useful herein are similar to certain of the slippery polymers of Ser. No. 336,244. Thus, they are alike in being produced from copolymers of styrene and aliphatic (i.e., acyclic) vinyl comonomers including acrylonitrile, acrylic and methacrylic acids and alkyl esters thereof. The present materials also resemble those of that application in being made by sulfonation of surfaces of articles made of the said styrene-aliphatic vinyl copolymer. The articles used for vessels in the practice of this invention are made from copolymers containing about 10 to 60 weight percent styrene and preferably 15 to 50 percent as against ranges of 20 to 85 and preferably 50 to 75 employed in Ser. No. 336,244, the weights being expressed conventionally as charge weights of monomers reacted. In other words, those polymers are generally lower in aromatic content. This is somewhat surprising as it would seem that greater hydrophilicity could be achieved if more aromatic groups were present for sulfonation, however, it is found that the useful materials are obtained from the copolymers indicated. These proportions provide sulfonated copolymer having zeta potential determined on material scraped off from about −5 to −70 millivolts and preferably −10 to −65 millivolts. The zeta potential is a measure of the negative charge of the sulfonated surface in an aqueous environment. In a more quantiative sense, the amount of styrene used must be sufficient so that the subsequently treated surface of the polymer has a durable hydrophilic, slippery surface, too much acyclic or aliphatic vinyl monomer resulting in a surface which, though it may be initially slippery, is in the nature of a sline or gel which is not durable and not strongly bonded to the substrate, and is easily washed off or abraded. On the other hand, if the copolymer contains no acyclic vinyl comonomer, or if the comonomers are omitted, and one sulfonates the surface of polystyrene alone, the slippery surface is not produced. The copolymers used in this invention are preferably random copolymers but it is within the scope of this invention to use block, graft, or alternating copolymers; also, it is within the scope of this invention to use blends of two or more of such copolymers.

Representative acyclic vinyl comonomers include acrylonitrile, acrylic acid and alkanol esters of such acids, such as butyl acrylate and the like. We have found that copolymers of styrene and acrylonitrile, styrene and methyl acrylate, styrene and ethyl acrylate, styrene and n-butyl acrylate and terpolymers of styrene, acrylonitrile, and n-butyl acrylate are particularly suitable in the practice of this invention.

The shaped articles which are to be treated can be fabricated by extrusion, injection or compression molding, machining, calendaring, wet- and dry-spinning, potting, casting, and the like. Alternatively the shaped articles can be fabricated in whole or in part from fibers, filaments, yarns, threads, ribbons, foils, self-supporting films and sheets. The polymeric material is treated in the shape in which it will subsequently be used. The polymeric material may have incorporated in it various additives and adjuncts such as pigments, dyes, plasticizers, etc., as long as these do not prevent the formation of or adversely affect the slippery, non-thrombogenic character of the surface.

The treatment of the above-described articles is carried out by contacting the surfaces to be in contact with blood with fuming sulfuric acid or sufficient concentration for a sufficient period of time and at a sufficient temperature to cause the formation of a durable slippery blood compatible surface. The treatment is more than superficial and penetrates a short, but measurable distance into the body of the shaped article. The degree or extent of modification of the article will vary with not only the particular polymer being treated but with the concentration of the fuming acid, and the temperature and duration of the treatment. In any event, it is only the surface region of the article which is modified, that is, the article is not sulfonated throughout its interior or bulk, and thus the physical properties, such as tensile strength, generally remain intact and are not materially modified. Generally, a durable slippery blood compatible article will be produced at temperatures in the range of 0° to 100° C., preferably 15° to 55° C. and typically at ambient temperature. The duration of the treatment will generally vary from a few seconds to 15 minutes or longer, and contact or treatment times in the range of 30 seconds to 2 minutes generally will be adequate and are preferred. If reaction is found to be inadequate, it can be repeated for further periods of time until the desired zeta potential is achieved.

The fuming sulfuric acid can have 2 to 30 weight percent, preferably 5 to 10 weight percent, free of excess sulfur trioxide. Hot, concentrated sulfuric acid can also be used because it can be equivalent to fuming sulfuric acid. However, fuming acid is preferred because it will function well without having to be heated.

The treatment of the above-described articles may also be accomplished by contacting their surfaces with sulfur trioxide gas. The time of contact can be varied from a few seconds to several minutes. Generally, this treatment requires longer exposure times and is not applicable to all the above cited copolymers which can be successfully treated with fuming sulfuric acid. The $SO_3$ is most effective with polymers which are inherently capable of imbibing a measurable percentage of atmospheric moisture. It is believed that in such cases, this imbibed moisture reacts with gaseous $SO_3$ producing fuming sulfuric acid in situ. Other chemicals often conventionally referred to as sulfonating agents, such as concentrated sulfuric acid (at room temperature), and chlorosulfonic acid, have not been found suitable to produce a durable hydrophilic article.

Following contact of the article with the sulfonating agent, the treated surface is washed with water. It can be dried in air or, alternatively, after the water wash, the treated surface can be contacted with a dilute aqueous solution of a base such as ammonium hydroxide, calcium hydroxide, sodium bicarbonate, or potassium carbonate, in order to neutralize any acid groups in the surface or any free acid present on the surface, and the neutralized surface then further washed in water and dried in air. In another alternative treatment, the water washed article may be stored in an isotonic solution, Ringer's solution (0.700 grams of sodium chloride, 0.0026 grams of calcium and 0.035 grams of potassium chloride in 100 ml. of de-ionized water). Lactated Ringer's solution, additionally containing sodium lactate, may also be used.

The depth of the dry treated zone or skin will vary with the particular polymeric material and the treating conditions used and generally will range between 2 and 150 microns. Articles with treated surfaces of from 2 to 70 microns in thickness can exhibit the durable slippery property when wet with water sufficiently to be useful in the present invention. The skin or zone formed by the treatment becomes not only hydrophilic but swells as much as 3 to 4 times in thickness in contact with water, forming a uniform film on the treated surface. These non-thrombogenic articles will have 20 to 400 milliequivalents per square meter (meq./$m^2$) of surface area of titratable sulfonic groups with a standard deviation of 7 to 10%. Infrared spectral analysis, with a Perkin-Elmer 137 Spectrophotometer, of the treated material, after being washed, neutralized, and dried in air, reveals the presence of sulfonic acid groups located in the para position of the aromatic nucleus. Repeated washing and drying of the treated article does not alter the slippery and non-thrombogenic character of the article, nor does mild abrasion or rubbing with a cloth, the treated zone being firmly affixed to the base polymer. The material comprising the slippery layer is highly hydrophilic and water-swellable, as contrasted to the hydrophobic base polymer substrate to which it is bound.

It is believed that the slippery surface zone or skin as found in the non-thrombogenic articles of this invention is composed of cilia or microscopic to submicroscopic strands attached at one end where the content of sulfonic acid groups is less to the article itself and moving freely in the aqueous medium such as blood at the distal or outer end. Because the cilia will all bear like charges, they tend to be mutually repulsive and thus unlikely to become entangled but stand at right angles relative to their basis or roots. The outermost end where there is the greatest concentration of sulfonic acid groups is thus conceived to be a constrained sol with a transition zone toward the roots or bases where there is less modification and finally the unmodified substrate.

The blood-containing vessels contemplated in this invention include ex vivo articles, which handle, treat or store whole blood and blood components outside the body and in vivo articles which conduct, pump or treat blood within the body. Examples of the former are containers for whole blood or blood components, blood purification and oxygenation apparatus, tubing, metering devices, pumps and the like. Examples of the latter are cardio-vascular prostheses such as artificial blood vessels, heart valves, heart assist devices and the like. Also included are connecting tubes, shunts, catheters and cannulae which are temporarily inserted into the cardiovascular systems or attached semi-permanently for purposes of diagnosis or treatment.

The blood compatibility of the shaped articles of this invention is believed to be related to the unique physical form and chemical structure in the region of the surface as described above. When a shaped article such as cardiovascular prosthesis or other article for use in contact with blood (either in vivo or ex vivo) has a "constrained sol" surface zone with bound anionic groups as described above, it exhibits non-thrombogenicity. In fact, it is believed that if it were not for this "constrained sol" surface zone the shaped article would have severely impaired or no utility for blood contact applications. The blood compatibility is thought to be a direct consequence of the unique morphological structure and the electronegativity (zeta potential) as described above.

The property of blood compatibility has been determined experimentally by several means. The structure and physical properties have been determined independently. The following explanation linking structure with performance is advanced as a means of elucidating the invention but is advanced as a theory only and is not to be construed as limiting. The complexity and obscurity of the mechanism of blood coagulation (thrombosis) are well known so any hypothesis as to the working mechanism of a blood compatible material must be considered tentative. This hypothesis, therefore, should not be taken as established fact and should not in any way restrict the scope of this invention.

Blood coagulates by a mechanism involving three overall steps:

1. Platelets adhere to a surface.
2. Adenosine diphosphate released by the adhered platelets causes platelet aggregation followed by viscous metamorphosis.
3. Thrombin is activated, combining with fibrinogen to form fibrin which reinforces the platelet aggregate and traps other hematocryt to form the clot.

The first catalytic agent is thromboplastin released from damaged tissue or formed by the reaction of released Platelet Factor 3 with other blood factors. Platelets are activated when they adhere to a foreign surface, i.e., a liquid-solid interface. It is believed that the sticking of the platelets causes them to release the platelet factors which then trigger the clotting sequence.

In blood, the platelets (thrombocytes) are present suspended with other cellular components, leucocytes and erythrocytes. When blood is contacted with shaped articles of this invention having the outermost constrained sol layer, a platelet moving randomly in the stream may approach the article. If the surface were of an ordinary nature the platelet would impinge, adhere, become activated, and initiate the coagulation sequence. However, a platelet approaching the surface of articles of the invention does not encounter a discrete interface between the solid and the fluid but enters a region of negatively charged microscopic strands. Since the platelet is also negatively charged, it will experience repulsion. As it invades the region and encounters an increasing number of strands, it will be successively slowed and stopped, then expelled from the region. Hence, it does not become activated. The situation is believed not unlike that encountered at the internal walls of blood vessels. The latter are electronegatively charged and are of a highly hydrated nature.

The invention is now further illustrated by the following examples in which all percents are in mol percents.

EXAMPLE 1

A copolymer of styrene and acrylonitrile (about 35 and 65% respectively) is prepared as follows:

Into a one-pint amber glass bottle are charged the following materials:

| | |
|---|---|
| Styrene | 34.4 grams |
| Acrylonitrile | 40.7 |
| Duponol ME | 2.0 |
| Potassium Persulfate | 0.75 |
| Sodium Phosphate Dibasic | 0.75 |
| Distilled Water | 225.0 |
| Lauryl Mercaptan | 1.5 |

The Duponol ME (a tradename for commercial grade sodium lauryl sulfate manufactured by the E. I. duPont de Nemours and Company), potassium persulfate, sodium phosphate dibasic, lauryl mercaptan, (all reagent grade), and distilled water (freshly boiled and stored under nitrogen) are added to the bottle which is then flushed with nitrogen and sealed with a screw top cap having a polyethylene liner. The bottle is shaken gently until all of the ingredients dissolve. The styrene and acrylonitrile are then added, and the bottle is flushed with nitrogen for 5 minutes, recapped tightly, and placed in a tumbler bath at 50° C.

After 90 hours the flask is removed and the solids content of the emulsion determined and found to be 26.2% by weight, indicating complete conversion of monomers to copolymer.

The copolymer is precipitated by pouring the contents of the bottle into 3 liters of methanol. The precipitated copolymer is removed from the liquid by vacuum filtration, washed repeatedly with water on the filter, then twice with methanol. After drying the yield of copolymer is 67.3 grams. The inherent viscosity in dimethyl formamide at 0.2% solids is 2.78, in methyl ethyl ketone at 0.5% solids 0.52.

A film of the copolymer of about 0.2 mm. thickness is made by pouring 100 grams of a solution (4 grams of copolymer in 100 grams of dimethyl formamide) into a glass ring of 120 mm. inside diameter and 10 mm. high cemented to plate glass, and allowing the solvent to evaporate at 80° C. to 90° C. over several days. The film is then vacuum dried at 80° C. for 24 hours. It is tough, somewhat rigid, of uniform thickness, smooth and bubble-free.

After removal from the glass, the film is dipped in 10% fuming sulfuric acid for 30 seconds at 23° C., thoroughly rinsed in de-ionized water followed by soaking in 500 ml. of de-ionized water for 5 days. The de-ionized water is decanted each day and replaced with fresh de-ionized water. After the 5th day, the film is removed, drained and air dried. When moistened with water, it exhibits the characteristic slipperiness desired for blood compatibility. The zeta potential is −45 millivolts.

Discs of 19 mm. diameter were cut using a circular die and were placed in lactated Ringer's solution (Ringer's solution containing 310 milligrams of anhydrous sodium lactate). The ionic content of this solution simulates the ionic content of mammalian blood. After overnight soaking in the lactated Ringer's solution, the disc specimens are tested for compatibility with fresh blood by placing them in a Petschek cell and exposing them to blood issuing slowly from the carotid artery of a dog. A description of the test apparatus and method is given by P. N. Madras, W. A. Morton and H. E. Petschek. Proceedings of American Societies for Experimental Biology, Vol. 30, No. 5, page 1665 (Sept. - Oct. 1971).

After ten minutes of exposure to flowing blood, the test specimens are gently rinsed with Ringer's solution, fixed by immersion in a 1% solution of glutaraldehyde, dried and examined by the scanning electron microscope. The specimens appear perfectly clean. There are no blood platelets, no strands of fibrin, and no red blood cells adhered to the surfaces.

In contrast, a specimen of a styrene:acrylonitrile copolymer which had not been surface sulfonated had platelets, fibrin, and red blood cells adhered to the surface after only two minutes of contact with the blood, and after 5 minutes a well developed clot covered the surface. Thus, the Petschek cell test clearly demonstrates the non-thrombogenic character of the "slippery polymer" surface and the thrombogenic character of the parent copolymer.

EXAMPLE 2

A 10 cm. by 10 cm. sheet, 0.25 mm. in thickness, of a styrene:acrylonitrile copolymer (containing 65% styrene available commercially as Tyril®-767 (manufactured by the Dow Chemical Company) is surface-sulfonated and washed following the same procedure as that used in Example 1. Discs for the Petschek cell are cut out, stored in lactated Ringer's solution, and tested for thrombogenic behavior by the same method as that used in Example 1. The surface is highly thrombogenic, becoming covered with fibrin and red blood cells in 5 minutes.

Small fragments of the water swollen sulfonated surfaces of Example 1 and Example 2 are suspended in double-distilled water and the zeta potentials of the particles measured by observing their velocities in a potential gradient of 20 volts per centimeter. The instrument used is the Zeta-Meter, manufactured by Zeta-Meter, Incorporated. The fragments from the surface of Example 1 exhibit a zeta potential of −45 millivolts, those of Example 2 −85 millivolts.

EXAMPLE 3

This examples illustrates a procedure for modifying unsatisfactory surfaces.

Disc specimens suitable for testing in the Petschek cell are cut from a sheet of the commercial copolymer of styrene and acrylonitrile described in Example 2. The discs are surface sulfonated by immersion in fuming sulfuric acid of 10% $SO_3$ content for 30 seconds at 23° C. as in Example 2. They are then rinsed in three changes of distilled water, washed in flowing de-ionized water for 4 hours and stored in de-ionized water.

Solutions of alkyldimethylbenzyl (wherein alkyl is said to be 14 to 18) ammonium chloride (Zephiran®, Winthrop Laboratories Division of Sterling Drug, Inc., New York, N.Y.) in concentrations of 0.1% to 0.5% and 1.0% by weight are prepared by suitable dilution of the 17% commercial product. Petschek cell discs are placed in each of these solutions and after 16 hours, scrapings are taken from these discs and from one which has not been treated with the alkyldimethylbenzyl ammonium chloride and the zeta potentials are measured. Other discs are removed from their respective solution, placed in lactated Ringer's solution for one hour, and tested for blood compatibility by exposure to canine arterial blood in the Petschek cell for 10 minutes. Duplicate tests are run using different dogs. The results were as follows:

| Sample Treatment | Zeta Potential | Blood Compatibility Test |
|---|---|---|
| Surface sulfonation | −80 mv | Massive fibrin clot in both tests. |
| Sulfonation plus 0.1% Zephiran | −44 mv | No clot in one test, but some adhered platelets. Second test partial surface coverage by fibrin. |
| Sulfonation plus 0.5% Zephiran | −23.5 mv | No clot. A few scattered platelets in both tests. |
| Sulfonation plus 1.0% Zephiran | −10 mv | Surface completely free of blood components in both tests. |

These results show that it is essential to maintain the zeta potential of the sulfonated surface at a negative potential less than −80 millivolts for the surface to exhibit non-thrombogenic properties. They also show that non-thrombogenic behavior is displayed over a range of negative zeta potentials of lower magnitude.

EXAMPLE 4

Discs for the Petschek cell are died from a film of the copolymer of styrene and acrylonitrile, 30:70 mol percent, made as described in Example 1. The discs are surface sulfonated by a two-step treatment, first being dipped in fuming sulfuric acid (10% $SO_3$) for 30 seconds followed by rinsing in distilled water and drying, then being given a second dip in the same fuming sulfuric acid followed by rinsing in distilled water and washing for several hours in flowing de-ionized water.

The zeta potential of scrapings of the wet, slippery surface of one of the discs is found to be −71 mv. Another disc is tested for thrombogenicitv in the Petschek cell and becomes covered completely with fibrin and cellular blood components. The results show that this copolymer, shown in Example 1 to be non-thrombogenic when sulfonated more moderately, that is for only one 30 second period, becomes thrombogenic when subjected to a higher degree of sulfonation, and that the zeta potential correspondingly becomes raised to a high negative value.

EXAMPLE 5

The following illustrates the preparation of a flexible copolymer containing about 35% by weight styrene suitable for use in catheters, blood bags and the like where compliant materials are needed.

Into a 3 liter, three-necked round bottom flask equipped with a mechanical stirrer, a pressure equalizing addition funnel, a condenser, means for flushing with nitrogen, a thermowell with a thermocouple and temperature recorder, and controlled heating means are charged 18.5 grams of potassium persulfate, 18.5 grams of disodium hydrogen phosphate, and 9.84 grams of sodium lauryl sulfate (Duponol ME manufactured by E. I. duPont de Nemours and Company) dissolved in 1500 ml. of distilled water which is freshly de-aerated by boiling. An initial monomer charge of 7.3 grams of styrene and 42.0 grams of ethyl acrylate is added and the flask is flushed with nitrogen. The heater is turned on and the temperature is raised to 50° C. over a period of 25 minutes. A monomer mixture consisting of 170.9 grams of styrene and 300.5 grams of ethyl acrylate is then added dropwise at a steady rate of 3.0 ± 0.2 ml. per minute. Over a period of one hour the temperature of the polymerization batch rises to 60° C. and it is held constant for the remainder of the monomer addition period. Three hours and five minutes after the initial monomer charge, the polymerization is completed.

The latex is diluted to a volume of one gallon (3785 ml.) with distilled water and coagulated by freezing in dry ice. The wet solids recovered after thawing are washed copiously in distilled water, then washed in methyl alcohol, and dried in a vacuum oven at 50° C. Four hundred ten (410) grams of dry solids are recovered.

An elemental analysis gives the following results:

| | |
|---|---|
| % carbon (theor. for 35:65 S:EA copolymer) | 71.5 |
| % carbon found | 71.8 |
| % hydrogen (theor. for 35:65 S:EA copolymer) | 7.9 |
| % hydrogen found | 8.0 |

The intrinsic viscosity, measured in methyl ethyl ketone at a concentration of 0.1 gram in 100 ml. of solution, is 1.27 deciliters per gram at 26° C. The glass transition temperature, measured by differential thermal analysis, is 19° C.

This polymer is melt pressed into flexible sheets or extruded into tubing for catheters. The sheets and tubing are moderately flexible at 23° C. and highly flexible at 37° C. When placed in fuming sulfuric acid of 10%, $SO_3$ content for 30 seconds and thoroughly washed in distilled water, the surface becomes very slippery to the touch. Microscopic examination of a section through the wet surface shows the typical filamentous structure to a depth of about 30 microns.

Discs cut from the surface sulfonated pressed film are tested in the Petschek cell by exposure to blood issuing from the carotid artery of a dog for 10 minutes. The discs are lightly rinsed in Ringer's solution and stored in 1% glutaraldehyde solution. They are then prepared for examination by the scanning electron microscope using standard techniques as previously described, except that the specimen is dried by the critical point drying method. This involves successive displacement of wetting liquids by others of lower surface tension until finally the specimen is wet by a substance, e.g., one of fluorinated methanes, which is evaporated at a temperature and pressure above its critical point. This usually provides specimens with undistorted surface structure.

The photographs from the scanning electron microscope, taken at magnifications of 20, 200 and 2000, show no fibrin, some scattered leucocytes and a few erythrocytes and platelets. The platelets are not activated. This, together with the absence of fibrin, shows that the surface is not thrombogenic.

The zeta potential of scrapings from the wet, slippery sulfonated surface is found to be −50 mv.

This polymer is eminently suitable for fabrication into catheters, cannulae and other blood contacting devices. When surface sulfonated, it exhibits the desirable properties of flexibility, good strength, slipperiness and non-thrombogenicity.

EXAMPLE 6

This example describes the preparation of a flexible 12:48:40 terpolymer of styrene, acrylonitrile and n-butyl acrylate which becomes slippery and non-thrombogenic when its surface is sulfonated.

Into a polymerization flask of the type used in Example 5 but of 500 ml. capacity is charged a solution of 0.75 grams of potassium persulfate, 0.75 grams of disodium hydrogen phosphate, 2.0 grams of sodium lauryl sulfate and 225 grams of water. After purging the flask with nitrogen, a monomer charge consisting of 0.40 grams of styrene, 2.12 grams of acrylonitrile and 5.12 grams of n-butyl acrylate is added. The mixture is stirred vigorously to emulsify the monomers and stirring is continued through the polymerization reaction. The temperature of the batch is raised to 50° C. over a period of 15 minutes. The remaining monomer charge, consisting of 10.0 grams of styrene, 19.5 grams of acrylonitrile and 38.0 grams of n-butyl acrylate is added at the rate of about 6 ml. per minute, the temperature being held between 50° and 53° C. The total reaction time is 3.5 hours.

The latex is poured into 3 liters of methyl alcohol to precipitate the polymer. It is washed 3 times in distilled water, then in methanol and vacuum dried at 50° C. A total of 66.0 grams of polymer is recovered as white chunks.

The intrinsic viscosity, measured at 0.10 grams per 100 ml. of solution in methyl ethyl ketone, is 3.14 deciliters per gram. The elemental analysis is as follows:

| | Carbon | Hydrogen | Nitrogen |
|---|---|---|---|
| Calculated for a 12/48/40 styrene/acrylonitrile/n-butyl acrylate terpolymer | 70.0 | 8.1 | 7.5 |
| From analysis | 70.4 | 7.9 | 7.1 |

The elemental analysis indicates that the composition of the terpolymer is very near that of the total monomer charge, 12:48:40 styrene:acrylonitrile:n-butyl acrylate in mol percent.

Pressed films of the terpolymer are flexible and clear. Though somewhat stiff at room temperature, 23° C., they become limp and compliant at 37° C.

Discs for th- Petschek cell are died out from sheets nominally 0.5 mm. in thickness and are surface sulfonated by placing them in fuming sulfuric acid (10% $SO_3$) for 30 seconds, then rinsing in distilled water and washing in flowing de-ionized water for eight hours. The wet disc have the characteristic "slippery polymer" feel.

A disc of this terpolymer, tested in the Petschek cell for thrombogenicity in the manner described in Example 5, displays a few isolated leucocvtes, but otherwise is free of fibrin or any other evidence of clot. This polymer is eminently suitable for fabrication into catheters, cannulae or other blood containing devices and can be rendered non-thrombogenic by surface sulfonation.

Particles scraped from the sulfonated polymer surface displayed a zeta potential of −36 ± 14 mv.

What is claimed is:

1. A blood-compatible substantially non-thrombogenic shaped article of water-insoluble solid copolymer of 10 to 60 mole percent styrene and 90 to 40 mole percent of at least one copolymerizable acyclic aliphatic comonomer of the formula $CH_2{=}C(R')—X$ wherein R' is H or $CH_3$, X is —CN, —COOH or -COOR" and R" is unsubstituted lower alkyl of 1–6 carbon atoms, said article having a ciliate hydrophilic surface containing 20 to 400 milliequivalents of sulfonic acid groups per square meter, said sulfonic acid groups being in the para-position of the aromatic nucleus of said styrene, and a electronegativity measured on detached portions of said ciliate hydrophilic surface as a zeta potential of from −5 to −70 millivolts.

2. A blood-compatible, substantially non-thrombogenic shaped article according to claim 1 wherein the solid copolymer is a copolymer of 15–50 mole percent styrene and 85–50 mole percent acrylonitrile.

3. A blood-compatible, substantially non-thrombogenic shaped article according to claim 1 wherein the solid copolymer is a copolymer of 15 to 50 mole percent styrene and 85–50 mole percent lower alkyl acrylate represented by the formula $CH_2{=}CH—CO_2R''$ wherein R" is unsubstituted lower alkyl of 1–6 carbon atoms.

4. A blood-compatible, substantially non-thrombogenic shaped article according to claim 1 wherein the solid copolymer is a copolymer of 15–50 mole percent styrene and 85–50 mole percent of acrylonitrile and n-butyl acrylate.

5. A process for modifying a ciliate hydrophilic surface of water-insoluble solid copolymer of 10 to 60 mole percent styrene and 90 to 40 mole percent of at least one copolymerizable acyclic aliphatic comonomer of the formula $CH_2{=}C(R')$-X wherein R' is H or $CH_3$, X is —CN, —COOH, —COOR", and R" is unsubstituted lower alkyl of 1–6 carbon atoms containing sulfonic acid groups in the para position of the aromatic nuclei of said styrene and rendering said surface substantially non-thrombogenic comprising the step of contacting said surface with a solution of an alkyl-dimethylbenzylammonium chloride wherein the alkyl group has from 14 to 18 carbon atoms for a sufficient length of time to reduce the electronegativity of said surface, as measured on detached portions of said surface as a zeta potential, to a value at least less than −70 millivolts.

* * * * *